United States Patent
Chu et al.

(10) Patent No.: US 8,266,347 B2
(45) Date of Patent: Sep. 11, 2012

(54) DATA TRANSMISSION METHOD AND TRANSMISSION CIRCUIT THEREOF

(75) Inventors: Shih-Hung Chu, Tao Yuan (TW); Hsun-Hsin Chuang, Tao Yuan (TW); Yu-Chun Peng, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 1070 days.

(21) Appl. No.: 11/669,159

(22) Filed: Jan. 31, 2007

(65) Prior Publication Data

US 2007/0217451 A1   Sep. 20, 2007

(30) Foreign Application Priority Data

Mar. 20, 2006   (TW) .............................. 95109408 A

(51) Int. Cl.
*G06F 3/00* (2006.01)
*G06F 13/42* (2006.01)
(52) U.S. Cl. .......................................... 710/61; 710/31
(58) Field of Classification Search .................. None
See application file for complete search history.

(56) References Cited

U.S. PATENT DOCUMENTS

| | | | |
|---|---|---|---|
| 5,280,539 A | | 1/1994 | Yeom et al. |
| 5,898,703 A | * | 4/1999 | Lin ................................ 714/726 |
| 6,243,756 B1 | * | 6/2001 | Whitmire et al. ............. 709/232 |
| 6,289,402 B1 | * | 9/2001 | Davis ............................... 710/31 |
| 6,463,494 B1 | * | 10/2002 | Morriss et al. ................ 710/305 |
| 6,914,637 B1 | * | 7/2005 | Wolf et al. ..................... 348/473 |
| 2005/0114577 A1 | | 5/2005 | Beckhoff et al. |
| 2006/0123306 A1 | * | 6/2006 | Whetsel ........................ 714/744 |

FOREIGN PATENT DOCUMENTS

| | | |
|---|---|---|
| CN | 1477510 | 2/2004 |
| EP | 280391 | 8/1988 |
| EP | 1061453 | 12/2000 |
| GB | 2181927 | 4/1987 |
| JP | 2-25140 | 1/1990 |
| JP | 8-111674 | 4/1996 |

OTHER PUBLICATIONS

Article titled "High Speed Serial Interface Protocol" published by IBM Technical Disclosure Bulletin, vol. 34, No. 7A Dec. 1991, pp. 355-365.
Article titled "Determination of Asynchronous Line Parameters and Device Class Via Software" published by IBM Technical Disclosure Bulletin, vol. 34, No. 4A Sep. 1991, pp. 39-42.

* cited by examiner

*Primary Examiner* — Henry Tsai
*Assistant Examiner* — Titus Wong
(74) *Attorney, Agent, or Firm* — Jianq Chyun IP Office

(57) ABSTRACT

A data transmission method and the transmission circuit thereof for transmitting data between a host and a peripheral apparatus are disclosed. The data transmission method includes the following steps. First, a clock signal is transmitted by a first pin. Then, a data signal is transmitted by a second pin according to the timing of the clock signal.

14 Claims, 2 Drawing Sheets

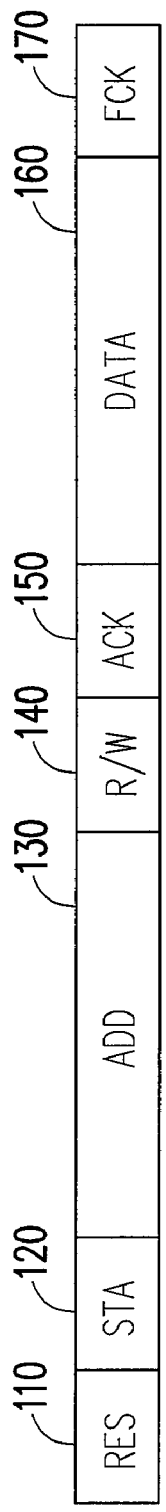
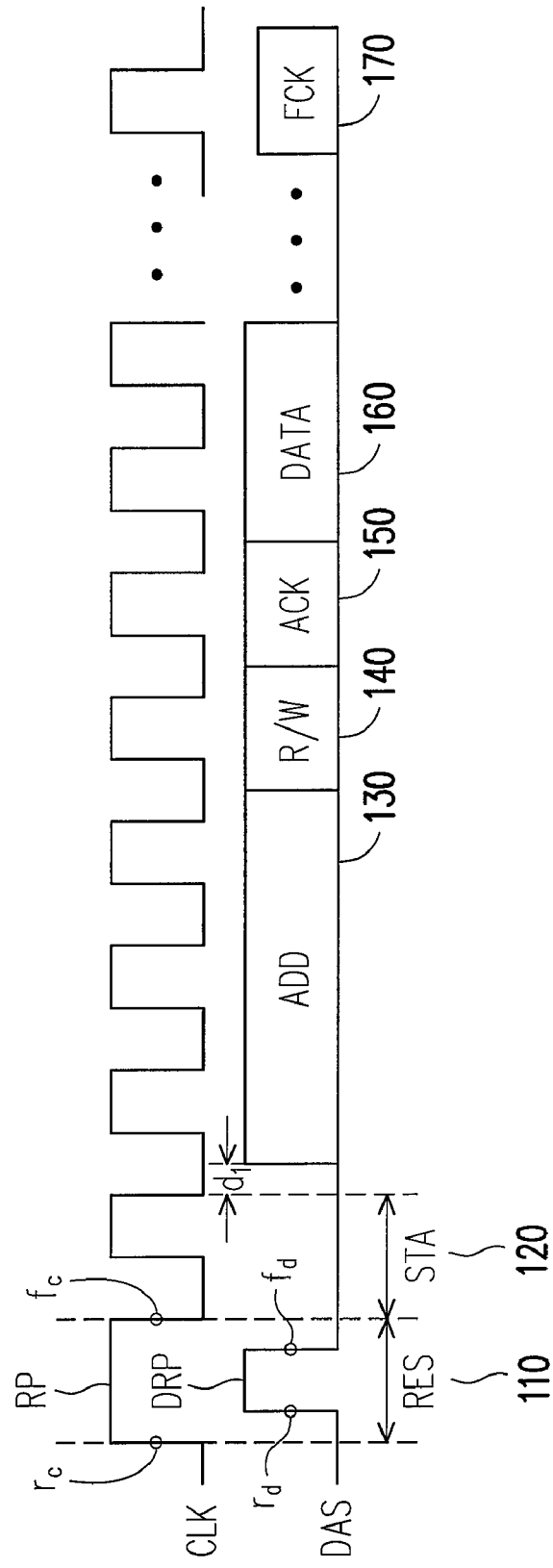

DATA TRANSMISSION METHOD AND TRANSMISSION CIRCUIT THEREOF

CROSS-REFERENCE TO RELATED APPLICATION

This application claims the priority benefit of Taiwan application serial no. 95109408, filed on Mar. 20, 2006. All disclosure of the Taiwan application is incorporated herein by reference.

BACKGROUND OF THE INVENTION

1. Field of the Invention

The present invention relates to a data transmission method and the transmission circuit thereof. More particularly, the present invention relates to a data transmission method and the transmission circuit thereof for transmitting a clock signal and a data signal simultaneously.

2. Description of Related Art

Conventional data transmission is generally classified into parallel transmission and serial transmission. When data are transmitted through parallel transmission, more transmission pins are required between chips, and accordingly the cost of the circuit design is higher. Moreover, encoding/decoding circuits are required in parallel transmission for encoding and decoding data, so that larger circuit space is required in circuit design and electromagnetic interference may be easily caused.

Presently serial transmission is mainly accomplished by universal serial bus (USB). Differential signal transmission method is adopted by USB and additional circuit spaces are required at both the sender and the receiver for disposing relative encoding/decoding circuits, thus, data cannot be directly transmitted through software protocol. As to those hand-held electronic devices which are being designed smaller and smaller, such as PDA, intellectual cell phone, GPS, player, and game machine, etc., the disposition of additional circuit or transmission pins will increase the manufacturing cost and complexity in design.

SUMMARY OF THE INVENTION

Accordingly, the present invention provides a data transmission method and the transmission circuit thereof for transmitting a clock signal and a data signal simultaneously, wherein data transmission between a host and a peripheral apparatus is controlled by software protocols and flexibility in the setting of data transmission is increased.

According to another aspect of the present invention, a data transmission method and the transmission circuit thereof are provided, wherein data transmission between the host and the peripheral apparatus can be accomplished with only two pins, so that the cost of circuit design and the space required by the circuit can be reduced.

The present invention provides a data transmission method and the transmission circuit thereof for transmitting data between a host and a peripheral apparatus. The data transmission method includes following steps. First, a clock signal is transmitted by a first pin, and then a data signal is transmitted by a second pin according to the timing of the clock signal. The clock signal is output from the host to the peripheral apparatus.

The foregoing data signal includes a data reset pulse, an address signal block, a reading/writing determination block, a data block, a pre-acknowledgement block, and an after-acknowledgement block. The data reset pulse resets the data signal at the reset pulse produced by the clock signal, and the address signal block is used for transmitting address data. The reading/writing determination block is used for transmitting reading/writing determination data to set the reading/writing status of the data signal, and the data block is used for transmitting data between the host and the peripheral apparatus and adjusting the data transmission direction between the host and the peripheral apparatus according to the reading/writing status of the data signal.

According to the present invention, data are transmitted through software protocol, thus, there is great flexibility in transmission settings, the transmission protocol can be adjusted any time according to different using environment, and the circuit needs not to be changed, so that the cost can be reduced. Meanwhile, according to the present invention, data transmission can be accomplished with only two pins, thus, the space required by the circuit and the device cost thereof can be reduced effectively.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a diagram illustrating the data transmission format according to an embodiment of the present invention.

FIG. 2 is a waveform of the data transmission format according to an embodiment of the present invention.

DESCRIPTION OF EMBODIMENTS

Figure 3:
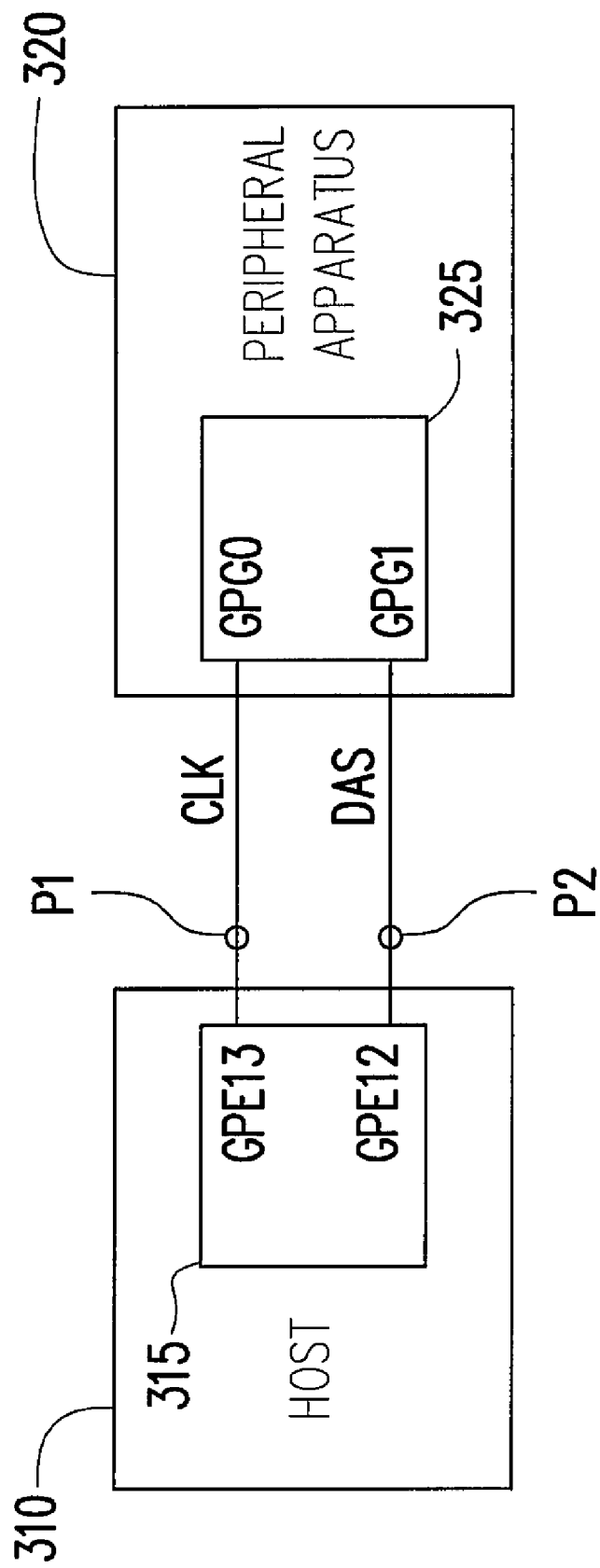
FIG. 3 is a schematic diagram of a data transmission circuit according to another embodiment of the present invention.

FIG. 1 is a diagram illustrating the data transmission format according to an embodiment of the present invention. Two pins are used for transmitting data between a host and a peripheral apparatus when a data signal is to be transmitted between the host and the peripheral apparatus. First, the host transmits a clock signal to the peripheral apparatus through a first pin to set up a synchronous clock between the host and the peripheral apparatus. Next, the data signal is transmitted between the host and the peripheral apparatus through another pin.

As shown in FIG. 1, the data transmission format in the present embodiment includes a reset block 110, a start block 120, an address signal block 130, a reading/writing determination block 140, a pre-acknowledgement block 150, a data block 160, and an after-acknowledgement block 170.

Wherein during transmission of the data signal, as long as the reset signal RES in the reset block 110 appears, the host and the peripheral apparatus reset the data signal, that is, the host and the peripheral apparatus re-produce the start block 120, the address signal block 130, the reading/writing determination block, 140, the pre-acknowledgement block 150, the data block 160, and the after-acknowledgement block 170 in sequence. The production of the reset signal RES is controlled by the host, which includes producing a reset pulse in the clock signal and producing a data reset pulse in the data signal. Wherein, during the occurring period of the reset pulse, the data signal produces the data reset pulse, and the rising edge of the data reset pulse is after the rising edge of the reset pulse, the falling edge of the data reset pulse is before the falling edge of the reset pulse.

The host transmits a start data STA to the peripheral apparatus in the start block 120 to inform the peripheral apparatus to start the data transmission. Then, the host transmits an address data Add in the address signal block 130 to the peripheral apparatus for connecting the data and the address. Next, the host transmits a reading/writing determination data R/W in the reading/writing determination block 140 to the peripheral apparatus, wherein the reading/writing determination data R/W can be divided into reading status and writing status. After the peripheral apparatus has completed receiving the foregoing reset signal RES, start data STA, address data ADD, and reading/writing determination data R/W transmitted by the host, the peripheral apparatus transmits a pre-acknowledgement data ACK in the pre-acknowledgement block 150 to the host to inform the host to transmit the data DATA.

The data DATA is divided into apparatus data and system data. In the data block 160, the peripheral apparatus transmits the apparatus data to the host if the reading/writing determination data R/W is in reading status, and the host transmits the system data to the peripheral apparatus for performing writing operation if the reading/writing determination data R/W is in writing status. After completing the transmission of the data DATA, the peripheral apparatus transmits an after-acknowledgement data FCK to the host in the after-acknowledgement block 170 to show that the operation has been completed.

Next, the technology of the present invention will be further described with reference to a signal waveform. FIG. 2 is a waveform of the data transmission format according to the present embodiment. The clock signal CLK is a continuous pulse signal, and the other pulse cycles are identical except the reset pulse RP in the reset block 110. When the host needs to reset the transmission of the data signal DAS, the clock signal CLK produces the reset pulse RP in the reset block 110, and the data signal DAS produces a data reset pulse DRP. The rising edge $r_d$ of the data reset pulse DRP is after the rising edge $r_c$ of the reset pulse RP, and the falling edge $f_d$ of the data reset pulse DRP is before the falling edge $f_c$ of the reset pulse RP. The combination of the reset pulse RP and the data reset pulse DRP is the reset signal RES.

The peripheral apparatus resets and re-receives the data signal DAS transmitted by the host when the peripheral apparatus receives the reset signal. Next, the host transmits the start signal STA to the peripheral apparatus, and in the present embodiment, the length of the start block 120 is 1 bit, and the start signal STA is logic low voltage level. Since in the present embodiment, the system performs data latching at the rising edge of the clock signal CLK and data transforming at the falling edge of the clock signal CLK, thus, after a short circuit operation delay time $d_1$, the host outputs the address data ADD to the peripheral apparatus. In the present embodiment, the length of the address signal block 130 is 3 bits, accordingly the length of the address data ADD is also 3 bits.

The main function of the reading/writing determination data R/W is to set the reading/writing status of the data signal DAS in the data block 160. In the present embodiment, the length of the reading/writing determination block 140 is 1 bit, if the reading/writing determination data R/W is logic high voltage level, the data signal DAS is in reading status. When the data signal DAS is in reading status, the peripheral apparatus transmits an apparatus data in the data block 160 to the host. If the reading/writing determination data R/W is logic low voltage level, the data signal DAS is in writing status. When the data signal DAS is in writing status, the host transmits a system data in the data block 160 to the peripheral apparatus.

Certainly, in another embodiment of the present invention, it can be set to that the data signal DAS is in reading status when the reading/writing determination data R/W is logic low voltage level and the data signal DAS is in writing status when the reading/writing determination data R/W is logic high voltage level, which should be easily understood by those having ordinary knowledge in the art and therefore will not be described herein.

There are respectively pre-acknowledgement block 150 and after-acknowledgement block 170 before and after the data block 160, in the present embodiment, the lengths thereof are both 1 bit. The pre-acknowledgement data ACK and after-acknowledgement data FCK transmitted by the pre-acknowledgement block 150 and after-acknowledgement block 170 are both logic high voltage levels. After the peripheral apparatus has completed receiving the address data ADD and the reading/writing determination data R/W, the peripheral apparatus transmits the pre-acknowledgement data ACK to the host. When the peripheral apparatus has finished data transmission in data block 160 with the host, the peripheral apparatus transmits the after-acknowledgement data FCK to the host to inform the host that the transmission has been completed. In the present embodiment, the length of the data block 160 is 8 bits, accordingly the length of the data DATA is also 8 bits.

FIG. 3 is a schematic diagram of a data transmission circuit according to another embodiment of the present invention. The host 310 and the peripheral apparatus 320 are connected through pins P1 and P2, wherein pin P1 transmits the clock signal CLK while pin P2 transmits the data signal DAS. The clock signal CLK is transmitted by the host 310 to the peripheral apparatus 320 for setting up a synchronous clock between the host 310 and the peripheral apparatus 320 as the clock basis for data transmission between the host 310 and the peripheral apparatus 320.

The host 310 further includes a host operation unit 315 while the peripheral apparatus 320 includes a peripheral operation unit 325, wherein the host operation unit 315 and the peripheral operation unit 325 respectively transmit and receive the clock signal CLK and the data signal DAS between the host 310 and the peripheral apparatus 320. In the present embodiment, the host operation unit 315 and the peripheral operation unit 325 can be both microprocessors, for example, complex programmable logic devices (CPLD). Accordingly, the communication protocol between the host 310 and the peripheral apparatus 320 can be completed through the settings of software program. The pins GPE12 and GPE13 of the host operation unit 315 are respectively coupled to the pins GPE1 and GPE0 of the peripheral operation unit 325 through the pins P1 and P2.

In the present embodiment, the transmission methods of the clock signal CLK and the data signal DAS are similar to those in the embodiment as shown in FIG. 1 and FIG. 2 and should be easily understood from the foregoing description of the embodiment in FIG. 1 and FIG. 2 by those having ordinary knowledge in the art, therefore will not be described herein.

All the data transmission protocol in the present invention can be accomplished through software settings and no additional encoding/decoding circuit is required, thus, in the present invention, the status meaning represented by the bit length and logic voltage level of each block can be set according to different requirement and should be easily understood by those having ordinary knowledge of the art, therefore will not be described herein. Moreover, the present invention can also be applied to the data transmission between two circuits and is not limited to data transmission between a host and a peripheral apparatus as described in the present embodiment.

In the present invention, data transmission is accomplished through software protocols so that the transmission protocols can be changed according to the requirement of different using environment without updating the hardware circuit design. In addition, in the present invention, data transmission can be accomplished by using only two pins, which makes debugging easier and can reduce the space required by and cost of the circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmission method, comprising:
    transmitting a clock signal by a first pin, wherein the clock signal has a clock reset pulse and a plurality of clocks subsequent to the clock reset pulse; and
    transmitting a data signal by a second pin according to the timing of the clock signal, wherein the data signal comprises a data block for transmitting data between a host and a peripheral apparatus;
    wherein during a period of the clock reset pulse occurring in the clock signal, the data signal produces a data reset pulse within the period of the clock reset pulse, wherein a rising edge of the data reset pulse is after a rising edge of the clock reset pulse, and a falling edge of the data reset pulse is before a falling edge of the clock reset pulse;
    wherein the data reset pulse is the only one pulse produced by the data signal within the period of the clock reset pulse, and the data signal is reset after the data reset pulse and the clock reset pulse occur;
    wherein the data signal further comprises a start block between the data reset pulse and the address block, and the host is further used for transmitting a start data to the peripheral apparatus in the start block.

2. The data transmission method as claimed in claim 1, wherein the clock signal is transmitted from the host to the peripheral apparatus in the step of transmitting the clock signal.

3. The data transmission method as claimed in claim 2, wherein the data signal comprises:
    an address signal block for transmitting an address data; and
    a reading/writing determination block for transmitting a reading/writing determination data to set the reading/writing status of the data signal; and
    wherein the data block is further used for adjusting the data transmission direction between the host and the peripheral apparatus according to the reading/writing status of the data signal.

4. The data transmission method as claimed in claim 3, wherein the data signal comprises:
    a pre-acknowledgement block, after the peripheral apparatus having completed receiving the data reset pulse, the address data, and the reading/writing determination data, the peripheral apparatus transmitting a pre-acknowledgement data to the host in the pre-acknowledgement block; and
    an after-acknowledgement block, being after the data block, the peripheral apparatus transmitting an after-acknowledgement data to the host in the after-acknowledgement block.

5. The data transmission method as claimed in claim 3, wherein the data reset pulse, the address data, and the reading/writing determination bits are all transmitted from the host to the peripheral apparatus.

6. A data transmission circuit, at least comprising:
    a first pin, for transmitting a clock signal, wherein the clock signal has a clock reset pulse and a plurality of clocks subsequent to the clock reset pulse; and
    a second pin, transmitting a data signal according to the timing of the clock signal wherein the data signal comprises a data block for transmitting data between a host and a peripheral apparatus;
    wherein during a period of the clock reset pulse occurring in the clock signal, the data signal produces a data reset pulse within the period of the clock reset pulse, wherein a rising edge of the data reset pulse is after a rising edge of the clock reset pulse, and a falling edge of the data reset pulse is before a falling edge of the clock reset pulse;
    wherein the data reset pulse is the only one pulse produced by the data signal within the period of the clock reset pulse, and the data signal is reset after the data reset pulse and the clock reset pulse occur;
    wherein the data signal further comprises a start block between the data reset pulse and the address block, and the host is further used for transmitting a start data to the peripheral apparatus in the start block.

7. The data transmission circuit as claimed in claim 6, wherein the clock signal is transmitted to the peripheral apparatus from the host when transmitting the clock signal.

8. The data transmission circuit as claimed in claim 7, wherein the data signal comprises:
    an address signal block for transmitting an address data; and
    a reading/writing determination block for transmitting a reading/writing determination data to set the reading/writing status of the data signal; and
    wherein the data block is further used for adjusting the data transmission direction between the host and the peripheral apparatus according to the reading/writing status of the data signal.

9. The data transmission circuit as claimed in claim 8, wherein if the reading/writing determination data is logic high voltage level, the data signal is in a reading status, and if the reading/writing determination data is logic low voltage level, the data signal is in a writing status.

10. The data transmission circuit as claimed in claim 8, wherein if the reading/writing determination bit is logic low voltage level, the data signal is in a reading status, and if the reading/writing determination bit is logic high voltage level, the data signal is in a writing status.

11. The data transmission circuit as claimed in claim 10, wherein the peripheral apparatus transmits data to the host in the data block if the data signal is in the reading status, and the host transmits data to the peripheral apparatus in the data block if the data signal is in the writing status.

12. The data transmission circuit as claimed in claim 8, wherein the data signal comprises:
   a pre-acknowledgement block, the peripheral apparatus transmitting a pre-acknowledgement data to the host in the pre-acknowledgement block after the peripheral apparatus having completed receiving the data reset pulse, the address data, and the reading/writing determination data; and
   an after-acknowledgement block, being after the data block, the peripheral apparatus transmitting an after-acknowledgement data to the host in the after-acknowledgement block.

13. The data transmission circuit as claimed in claim 8, wherein the data reset pulse, the address data, and the reading/writing determination bit are all transmitted from the host to the peripheral apparatus.

14. The data transmission circuit as claimed in claim 6, wherein the data signal is controlled by a complex programmable logic device (CPLD).

* * * * *